United States Patent [19]
Dougherty

[11] 3,903,233
[45] Sept. 2, 1975

[54] METHOD OF AND APPARATUS FOR EXTRUDING CONCENTRIC PLASTIC SHEATHS

[75] Inventor: Timothy Stephen Dougherty, Norcross, Ga.

[73] Assignee: Western Electric Company, Incorporated, New York, N.Y.

[22] Filed: June 14, 1974

[21] Appl. No.: 479,396

Related U.S. Application Data
[63] Continuation of Ser. No. 288,648, Sept. 13, 1972, abandoned.

[52] U.S. Cl. ............... 264/174; 117/75; 117/232; 156/244; 264/46.1; 264/176 R; 425/113
[51] Int. Cl.² .......................................... B29F 3/10
[58] Field of Search ......... 264/174, 173, 40, 45, 47, 264/46.1, 46.3; 425/113, 114; 156/51, 55, 244; 117/232, 94, 128.4, 75

[56] References Cited
UNITED STATES PATENTS

| | | | |
|---|---|---|---|
| 2,766,480 | 10/1956 | Henning | 425/113 |
| 2,766,481 | 10/1956 | Henning | 425/113 |
| 2,893,056 | 7/1959 | Henning | 425/113 |
| 3,121,255 | 2/1964 | Henning et al. | 425/113 |
| 3,229,012 | 1/1966 | Garner | 264/174 |
| 3,538,547 | 11/1970 | Drabb | 425/113 |
| 3,737,260 | 6/1973 | Kaye | 425/113 |
| 3,737,490 | 6/1973 | Nicholson | 264/40 |

Primary Examiner—Jeffery R. Thurlow
Attorney, Agent, or Firm—A. C. Schwarz, Jr.

[57] ABSTRACT

First and second concentric insulating sheaths of plastic materials are formed continuously around a filamentary core advancing longitudinally through an extrusion chamber. The core is passed axially through a tapered entrance portion and a coaxially aligned tapered throat portion formed in a separable die disposed in the chamber. Fluent plastic material for the first sheath is delivered from a main extrusion bore, impinging on the core circumferentially at the entrance portion of the die, the flow thereof being developed as it passes into the throat portion thereof. Fluent plastic material for the second sheath is delivered from an auxiliary extrusion bore flowing through a plurality of dividing channels formed in the die and radially inward at a plurality of circumferentially spaced points around the die axis into an annular manifold or reservoir where the fluid pressure of the plastic achieves a steady state condition. The plastic is forced from the manifold circumferentially, flowing in a frustoconical channel formed in the die which terminates in an annular fluid inlet formed in the throat portion of the die to impinge circumferentially around the first sheath, forming both sheaths simultaneously around the core.

3 Claims, 11 Drawing Figures

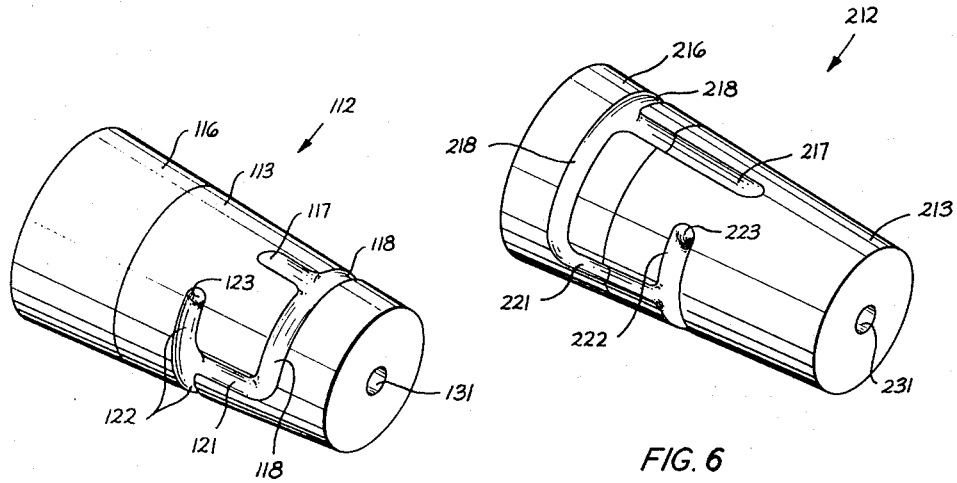
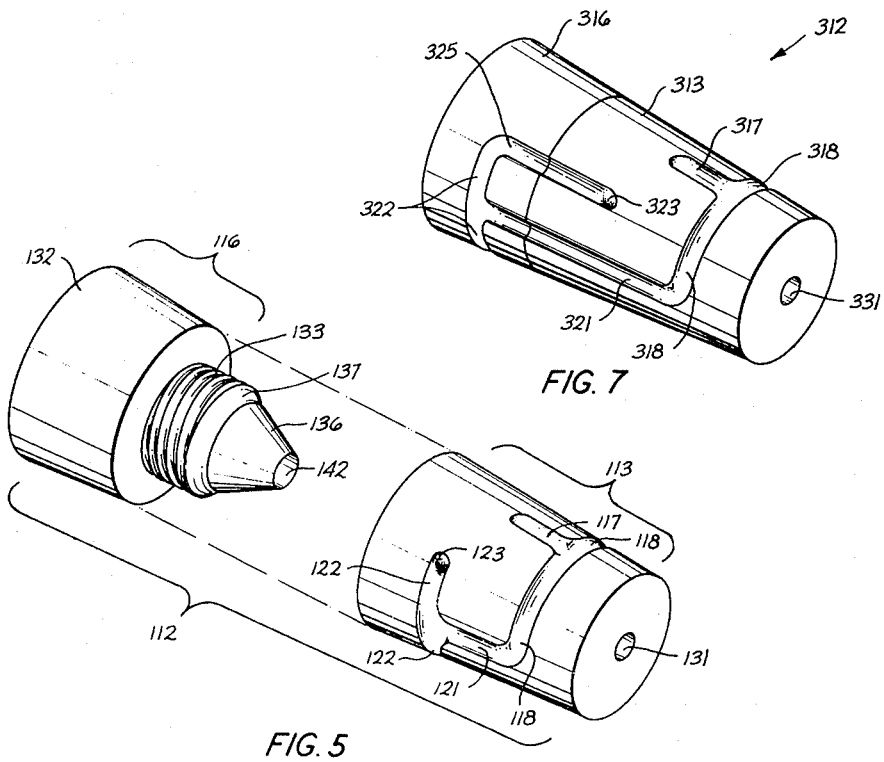

METHOD OF AND APPARATUS FOR EXTRUDING CONCENTRIC PLASTIC SHEATHS

This is a continuation of application Ser. No. 288,648, filed Sept. 13, 1972, now abandoned.

BACKGROUND OF THE INVENTION

1. Field of the Invention

The present invention relates to a method of extruding uniform coverings of plastic insulating materials upon filamentary cores, and more particularly, to a method of extruding first and second concentric sheaths of plastic insulating material coaxially around a longitudinally advancing filamentary core.

2. Technical Considerations and Prior Art

In the manufacture of plastic insulated wires, it is frequently desirable to provide the wire with two or more concentric uniform tubular sheaths coaxial with the wire. For example, in dual insulated wire, an inner sheath, which may be a soft plastic, or foam plastic, provides the primary insulating covering for the wire while an outer sheath may be a harder or more dense plastic to provide a protective covering for the inner sheath and the core.

Several problems have arisen when it is desired to extrude two concentric insulating sheaths of plastic material around a filamentary core, especially when the inner sheath is an expanded or foam-type plastic, for example, expanded polyethylene or polypropylene.

One method of extruding a dual insulating covering on a filamentary core utilizes a tandem arrangement of extruders one extruder for each sheath to be applied to the core in an extrusion die therein. While this is the simplest method of applying dual insulation, it is difficult to control the eccentricity of successively applied coverings thus giving rise to nonuniform capacitance variations coaxially in the cross sectional plane of the sheathed conductor.

Additionally, the tandem extrusion method, when utilized to extrude an expandable plastic such as polyethylene foam, gives rise to an inherent problem therein, that being the plating out in the forming portion of the die, of the heat-decomposible blowing agent admixed with the plastic compound, which requires the extrusion pressure to be increased to achieve a constant flow rate. Furthermore the residue formed in the die eventually leads to eccentricity of the sheaths and out-of-roundness of the product. Also the second sheath must be applied by tubular type extrusion tooling, e.g. in the second extruder, the plastic material cannot contact the primary insulated core until it has exited or nearly exited the die, since this is the only way to insure that sufficient clearance is provided in the second extruder to pass the insulated core. Since tubular extrusion is limited to lower line speeds, the tandem method results in lower production than can be achieved with a pressure method, where the plastic compound contacts the core in the die.

An improved prior art method of extruding dual concentric plastic sheaths onto an axially advancing conductor utilizes a single extrusion chamber in which first and second spaced, coaxially aligned dies pass the core sequentially. Plastic material for the inner sheath is delivered from a first extrusion bore to the first die where the plastic material is applied to and formed around the core. The insulated core is thereafter passed through the second die, to which the second plastic material is delivered from a second extrusion bore to impinge upon and be formed around the insulated core.

The two-die method permits higher line speeds than the tandem method, but requires a critical coaxial alignment of the dies to prevent eccentricities between the insulating sheaths. Furthermore, when an expanded plastic is utilized for one or both sheaths, plating out of the blowing agent on one or both dies is still a problem. But the most serious defect of the two-die method is that the pressures in the dies are cumulative, making it difficult to control the blowing of the expanded plastic.

In still another prior art method, the plastic material for the outer sheath of a dual insulated wire is bled around the entrance portion of the forming die in the extrusion passageway before the insulating material for the first sheath is compressed around the advancing core such that the second plastic forms a barrier between the forming die and the first sheath.

This method prevents plating out of the blowing agent where the inner sheath is an expanded plastic and the outer sheath is a solid plastic, but, since the plastic material for both sheaths communicate with one another directly before the flow of at least the plastic for the inner sheath is permitted to develop, irregularities and nonuniform skin thickness can result. Furthermore, if there are substantial differences in the melting point temperatures of the materials, the hotter plastic may cause the cooler plastic to burn, or the cooler plastic may reduce the temperature of the hotter plastic below its melting point causing premature solidification thereof, producing lumps therein.

In still another prior art method the outer sheath is formed as the core having the inner sheath already formed thereon issues from the die in a single extrusion chamber. The outer sheath is formed by the plastic material therefor being forced onto the inner sheath in two or more streams. This can result in "knit" lines being formed on the outer sheath where the streams converge. The localized pressure from the streams may also deform the inner sheath and the core.

There exists therefore, a need for a method of extruding dual concentric plastic sheaths onto a moving elongated core at high line speeds and low pressures wherein plating out of the blowing agent for expanded plastics is eliminated, or minimized and better control of expansion is obtained, wherein the temperature differences of the plastic materials present no problems, and wherein the inner and outer sheaths are concentric and are of uniform thickness.

SUMMARY OF THE INVENTION

One object of the invention is to provide a new and improved method of extruding concentric plastic sheaths.

Another object of the present invention is to provide a new and improved method of extruding two or more concentric plastic sheaths coaxially onto an advancing filamentary core.

Another object of the present invention is to provide a new and improved method of simultaneously extruding two concentric uniform plastic sheaths of insulating material onto a moving filamentary conductor at substantially high line speeds and low pressures, wherein one sheath may be an expanded plastic.

A method of forming first and second concentric sheaths of plastic material around a longitudinally moving filamentary core, in accordance with the present invention, may include passing the core through a confined passageway, introducing a first fluent plastic material into the passageway circumferentially around and in the direction of the moving core and introducing a second fluent plastic material into an intermediate section of the passageway circumferentially around and in the direction of the flowing first plastic material at a sufficient distance from the point of introduction of the first plastic material to have allowed the flow of the first plastic material to develop.

BRIEF DESCRIPTION OF THE DRAWINGS

A more complete understanding of the present invention will be obtained from the following detailed description of a preferred embodiment and three exemplary alternative embodiments thereof, when read in conjunction with the accompanying drawings, wherein:

FIG. 4 is a perspective view of one embodiment of a separable channeled die in accordance with the principles of the present invention;

FIG. 5 is an exploded perspective view of the die of FIG. 4;

FIGS. 6 and 7 illustrate alternative embodiments of the separable die of FIG. 4;

DETAILED DESCRIPTION

Figure 1:
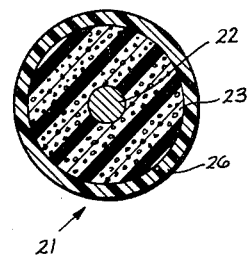
FIG. 1 is a cross-sectional view of an insulated wire which includes a conductive filamentary core having first and second concentric uniform sheaths or coverings of plastic insulating material thereon.

Referring to FIG. 1, a dual insulated wire 21 includes a filamentary conductive core 22 having two concentric sheaths 23 and 26 of plastic insulation thereon. The inner sheath 23 is preferably formed of an expanded or foam plastic, for example, polyethylene containing a multiplicity of minute blown cells distributed uniformly throughout the sheath 23. The outer sheath or skin 26 is preferably a solid plastic, for example, polyvinyl chloride (PVC) which forms a protective jacket around the expanded plastic sheath 23.

Alternatively, both sheaths 23 and 26 may be solid plastic, both may be expanded plastic, or the outer sheath 26 may be expanded plastic over an inner sheath 23 of solid plastic. Also both sheaths may be of the same material, for example, high density polyethylene or polypropylene over expanded polyethylene or polypropylene, respectively.

The conductor 22 may be formed of, for example, copper or aluminum, and may range in diameter from 16 to 45 mils. The outer diameter of the insulated wire 21 may range between 30 and 80 mils. The wall thickness of the outer sheath 26 may range between 2 and 5 mils.

Figure 2:
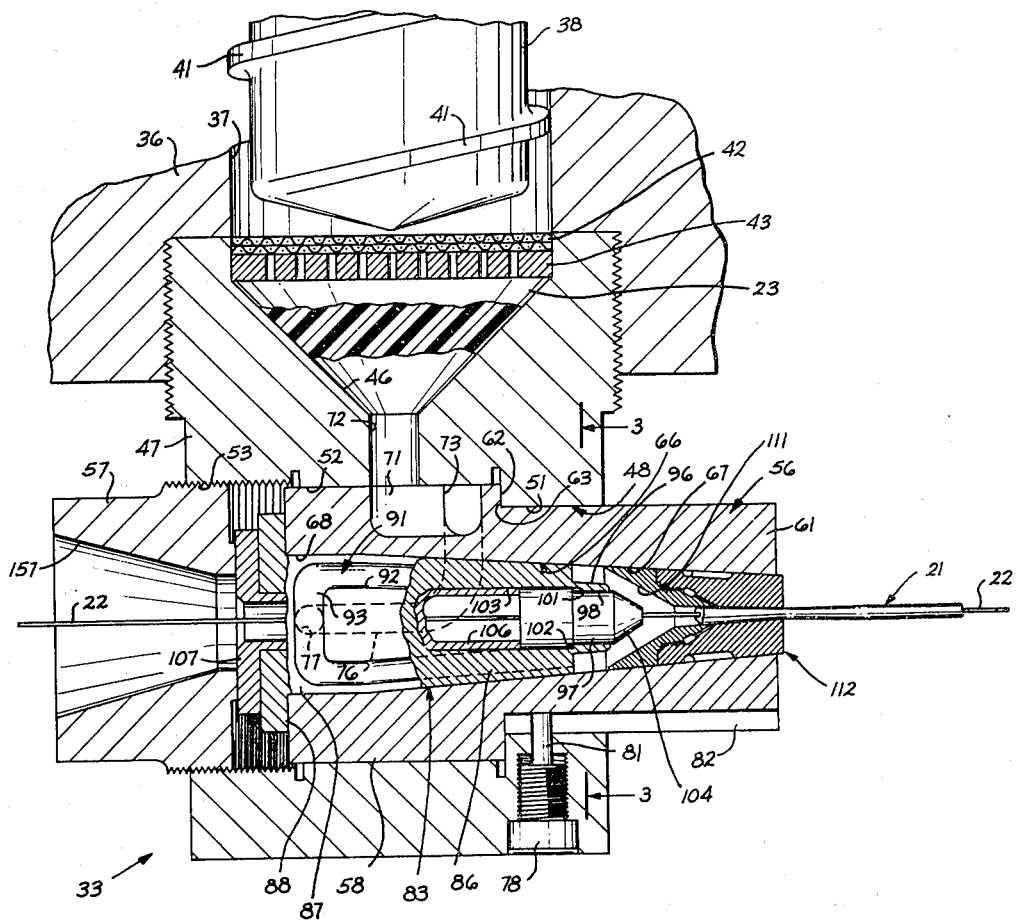
FIG. 2 is a fragmentary, partial horizontal section of an extrusion apparatus, illustrating certain features of the invention, for applying the plastic insulating sheaths to the filamentary core of FIG. 1.

The dual insulation on the insulated wire 21 may be extruded onto the conductor 22 by an extrusion apparatus 33, as shown in FIG. 2. The following description will assume that the insulated wire 21 is being covered with a dual insulating sheath comprising PVC over expanded polyethylene. It should be understood, however, that the apparatus 33 may be utilized for extruding both solid and expanded plastics and that the term "plastic" is intended to include both thermoplasitc and thermosetting materials including rubber and rubber-like materials.

Referring to FIG. 2, the extrusion apparatus 33 includes an extrusion cylinder 36 formed with a centrally located elongated, cylindrical, main extrusion bore 37 having a stock screw 38 mounted for rotation about a longitudinal axis therein by suitable drive means (not shown). Helical threads 41—41 formed on the stock screw 38 work and advance the plastic insulating material 23 for the inner sheath along the extrusion bore 37 to a delivery end thereof through a straining screen 42 and an apertured backing plate 43 adjacent thereto and aligned therewith at the mouth of an infundibular opening 46, formed in an extrusion head 47 threaded into the extrusion cylinder 36, with the opening 46 coaxially aligned with the extrusion bore 37 to form a continuation thereof. The opening 46 communicates with an axial extrusion passageway or chamber 48 formed in the extrusion head 47 in orthogonal relationship with the extrusion bore 37.

The filamentary conductive core 22 is longitudinally advanced at a uniform speed axially through the extrusion chamber 48 wherein the plastic sheaths 23 and 26 are formed simultaneously and concentrically thereon.

The foregoing described components of the extrusion apparatus 33 are well-known in the art and are included for a proper understanding of the remainder of the apparatus 33, which includes the extrusion tooling, i.e. the parts of the extrusion head 47 within the chamber 48 which guide the core 22 through the apparatus 33 directing and applying the plastic material onto the core 22.

Though various types of extrusion tooling are available for applying the plastic material for the inner sheath 23 to the core 22, it is preferred to utilize tooling similar to the extrusion tooling disclosed in the application of D. L. Myers, Ser. No. 260,584, filed June 7, 1972, now abandoned, for which continuation-in-part application Ser. No. 303,435 was filed on Nov. 3, 1972, now U.S. Pat. No. 3,860,686, dated Jan. 14, 1975, all of which are assigned to the instant assignee.

As shown in FIG. 2, the passageway 48 includes a bore 51, a counterbore 52 and a tapped section 53 coaxial therewith. A generally cylindrical tool holder or capsule 56 is removably retained in the passageway 48 by a retainer plug 57 threaded into the tapped section 53 thereof. The capsule 56 includes an enlarged cylindrical portion 58, extending coaxially from which is a smaller cylindrical portion 61. The smaller portion 61 is disposed in the bore 51 with a shoulder 62, defined between the portions 58 and 61 of the capsule 56, engaging a step 63, defined between the bore 51 and the counterbore 52 of the passageway 48.

The capsule 56 is provided with an axial opening 66 therethrough which includes a frustoconical bore 67 extending coaxially from and communicating with a cylindrical bore 68. The outer periphery of the enlarged portion 58 of the capsule 56 is formed with an E-shaped guide channel for the plastic material from the main extrusion bore 37, including a central channel leg 71 aligned with a feed port 72 in the opening 46 in the head 47, to the passageway 48. The leg 71 intersects and communicates with a pair of contiguous circumferential channel legs 73—73 transversely aligned therewith and communicating with a pair of diametrically opposed longitudinal channel legs 76—76.

The central leg 71 and the outer legs 76—76 are mutually parallel and are parallel to the axis of the capsule 56. The channel legs formed in the periphery of capsule 56 are preferably generally semicircular or U-shaped in cross section but may have various cross sectional configurations, e.g. V-shaped, rectangular, etc.

A radial bore 77, communicating with the cylindrical bore 68 is formed in the enlarged portion 58 of the capsule 56 in the terminal end of each of the outer channel legs 76—76. Thus the terminal end of each leg 76 communicates with the bore 68.

The alignment of the capsule 56 in the passageway 48 is maintained by a socket head set screw 78, threaded into the head 47, having a lug 81 thereon extending into a longitudinal slot 82 formed in the smaller portion 61 of the capsule 56.

A core tube holder 83, having a generally frustoconical body 86 extending from a cylindrical member 87 having a flange 88 formed thereon, is removably fitted closely within the bores 67 and 68, respectively, of the axial opening 66 formed in the capsule 56.

Figure 3:
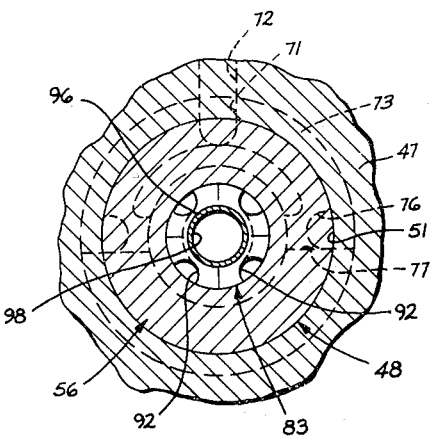
FIG. 3 is a sectional view of the apparatus of FIG. 2, taken along the line 3—3 thereof.

The outer periphery of the holder 83 is formed with a pair of diametrically opposed U-shaped channels 91—91, each of which includes a pair of elongated channel legs 92—92 connected by an arcuate channel leg 93. The radial bores 77—77, formed in the capsule 56, communicate with the central portions of the arcuate legs 93—93. The elongated channel legs 92—92 are substantially parallel at the portions thereof formed on the cylindrical member 87 and converge toward the smaller end of the holder 83, parallel to the conical periphery of the body 86, flaring out to form a frustoconical confluence 96. As seen from FIG. 3, the legs 92—92 are spaced equally about the axis of the core tube holder 83.

A cylindrical core tube 97 is removably retained within an axial bore 98 formed in the holder 83 with a shoulder 101 formed on the core tube 97 engaging a step 102 formed between the bore 98 and a counterbore 103 communicating therewith. A frustoconical tip 104, formed on the core tube 97, converges at a conical angle of approximately 60° and projects outwardly from the smaller end of the holder 83.

A tubular core tube retainer 106 having an annular flange 107 formed thereon, maintains the core tube 97 in position at the end of the holder 83. In addition to securing the capsule 56 in place, the retainer plug 57 also serves to retain the core tube holder 83 and the core tube retainer 106 in place within the capsule 56.

The tip 104 on the core tube 97 projects into a frustoconical entrance portion 111, which converges at a conical angle of 60°, formed in a separable channeled die 112, having a generally frustoconical outer surface and positioned at the leading end of the bore 67 formed in the capsule 56. The plastic material 26 for the outer sheath of the insulated wire 21 is delivered to the die 112 from a vertical extruder where it is applied to the core 22 simultaneously in a confined passageway in the die 112 with the plastic material 23.

Figure 8:
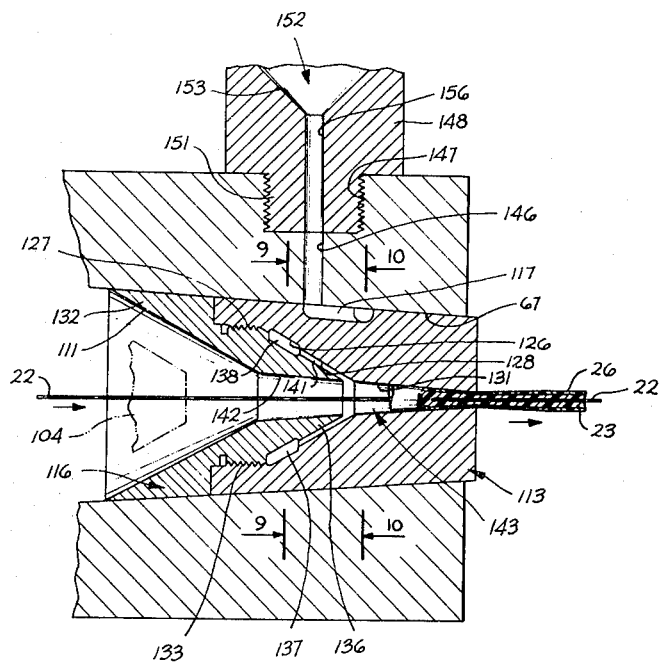
FIG. 8 is an enlarged vertical sectional view of parts of the apparatus of FIG. 2, particularly illustrating the die of FIG. 4.
Figure 9:
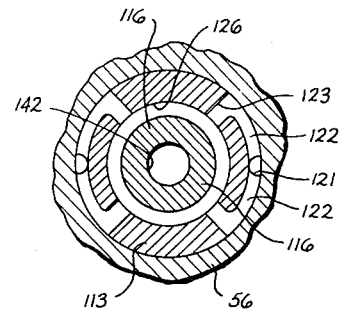
FIG. 9 is a sectional view of the die shown in FIG. 4, taken along the line 9—9 of FIG. 8.
Figure 10:
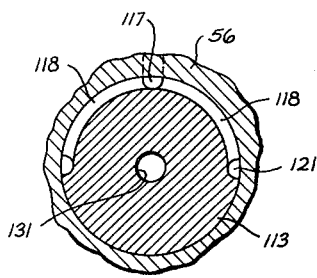
FIG. 10 is a sectional view of the die of FIG. 4 taken along the line 10—10 of FIG. 8.

Referring to FIGS. 4, 5, and 8, the die 112 includes first and second coaxial mating parts 113 and 116. The smaller forward part 113 of the die 112 is formed on the surface thereof with a plurality of guide channels the purpose of which is to divide the plastic material 26 into balanced streams for impinging the plastic material 26 concentrically around the inner sheath 23 on the core 22 in the die passageway.

A first longitudinal channel leg 117 intersects and communicates with a pair of contiguous circumferential channel legs 118—118 which communicates with second and third diametrically opposed, longitudinal channel legs 121—121. Each leg 121 terminates at the junction of a pair of contiguous equal circumferential channel legs 122—122 which terminate at radial bores 123—123 which communicate with an annular groove 126 formed between a tapped cylindrical bore 127 and a frustoconical bore 128 formed in the part 113 (see FIG. 8). A second frustoconical bore 131 is formed in the part 113 communicating and coaxial with the bore 128 to complete an axial passageway through the part 113.

The part 116 includes an enlarged frustoconical base 132 projecting from which is a threaded cylindrical projection 133 extending from which is a frustoconical tip 136 having an annular groove 137 formed thereon adjacent to the threaded projection 133.

The parts 113 and 116 are assembled together to form the die 112 by threading the threaded projection 133 of part 116 into the tapped bore 127 of the part 113.

When the parts 113 and 116 are assembled, the grooves 126 and 137 define an annular manifold 138 which communicates with an annular frustoconical channel 141 defined between the tip 136 on part 116 and the bore 128 in part 113.

A frustoconical bore 142 extends coaxially from the entrance portion 111 of the die 112 through the part 116 thereof. The bore 131 in part 113 and the bore 142 in part 116 of the die 112 are coaxially aligned when the parts are assembled, converging at the same conical angle, which is approximately 5°, and defining a throat 143 in the die 112. The channel 141 communicates with the throat 143 as an annular inlet thereto, at an intermediate section of the axial passageway through the die 112 defined by the entrance opening 111 and the throat 143.

The radial bores 123—123, which are spaced equally around the circumference of the part 113, form a path between the channel legs 122—122 and the manifold 138 defined by the grooves 126 and 137.

FIGS. 6 and 7 show two alternative embodiments of the extrusion die 112, the main difference of each with respect thereto being the manner in which its peripheral surface is grooved. This is merely to illustrate that the grooves formed on the periphery of the die can be altered to lengthen the flow path of the plastic material delivered thereto, as will be seen below, as long as certain principles relating to the flow of highly viscous or highly elastic plastic materials are recognized and followed.

As shown in FIG. 6, a die 212 including mating parts 213 and 216, is formed with a first longitudinal channel leg 217 which communicates with a first pair of contiguous circumferential channel legs 218—218 which communicates with second and third channel legs 221—221, each of which terminates in second and third pairs of contiguous circumferential channel legs 222—222. The distal ends of each of the channel legs 222—222 terminate at a radial bore 223. The longitudinal channel legs 217 and 221—221 are mutually parallel and extend over both parts 213 and 216, thus increasing the length of the flow path for the plastic material 26 into the die 212.

FIG. 7 shows a second alternative embodiment of the die 112 as indicated by the die 312, including mating parts 313 and 316. As in the die 212 of FIG. 5, the surface channeling of the die 312 extends over both parts 313 and 316, including a longitudinal channel leg 317 which communicates with a pair of contiguous circumferential channel legs 318—318 which communicates with second and third longitudinal channel legs 321—321, each of which terminates at a pair of contiguous circumferential channel legs 322—322. The die 312 is further formed with four additional longitudinal channel legs 325—325 each of which extends from the distal end of each leg 322, over the parts 316 and 313, terminating in a radial bore 323.

As can be seen from FIGS. 4, 6, and 7, the radial bores 123—123, 223—223, and 323—323, respectively, are located in similar positions around the circumference of parts 113, 213, and 313, respectively. Furthermore, the internal die structure of all three embodiments is identical for dual insulation and the radial bores all terminate in a manifold defined by a pair of aligned, spaced, annular grooves formed on adjacent mating parts.

As can be seen most clearly in FIG. 8, the die 112 is positioned at the forward end of the capsule 56 with the channel leg 117 aligned and communicating with a vertical feed port 146 formed in the capsule 56. The feed port 146 communicates coaxially with a tapped bore 147 formed in the capsule 56. A fitting 148, having a threaded cylindrical projection 151 thereon, is threaded into the tapped bore 147. The fitting 148 is formed with an axial passageway 152 which includes a tapered bore 153 and a coaxial smaller bore 156 extending therefrom and aligned with the feed port 146.

The fitting 148 may be connected to an auxiliary extrusion apparatus (not shown) which delivers the plastic material 26 for the outer sheath of the insulated wire 21 vertically to the extrusion chamber 48, as represented by the capsule 56.

The flow channels formed on the capsule 56 and the core tube holder 83 for the plastic material 23, and on the die 112 for the plastic material 26, utilize the balanced flow principles for highly viscous or highly elastic plastic materials set forth in the above-identified applications of D. L. Myers. These principles have been incorporated into the design of the apparatus 33, whenever a stream of fluent plastic material is subdivided subsequent to a bend therein.

Stated briefly, if a stream of plastic is separated before the material can achieve steady state flow characteristics i.e., flow in a straight path in a confined channel for a sufficient time to allow the fluent plastic to recover from the transient pressure and velocity gradients produced therein by the bend, the pressure and velocity gradients in the divided stream can be shown to be identical if the separation occurs symetrically with respect to the principal plane of the bend. It has further been found that steady state flow of plastic material in a confined channel is achieved if the ratio of the length of the channel to the diameter thereof exceeds an empirically determined number, e.g. 5 to 10 for PVC and polyethylene.

Figure 11:
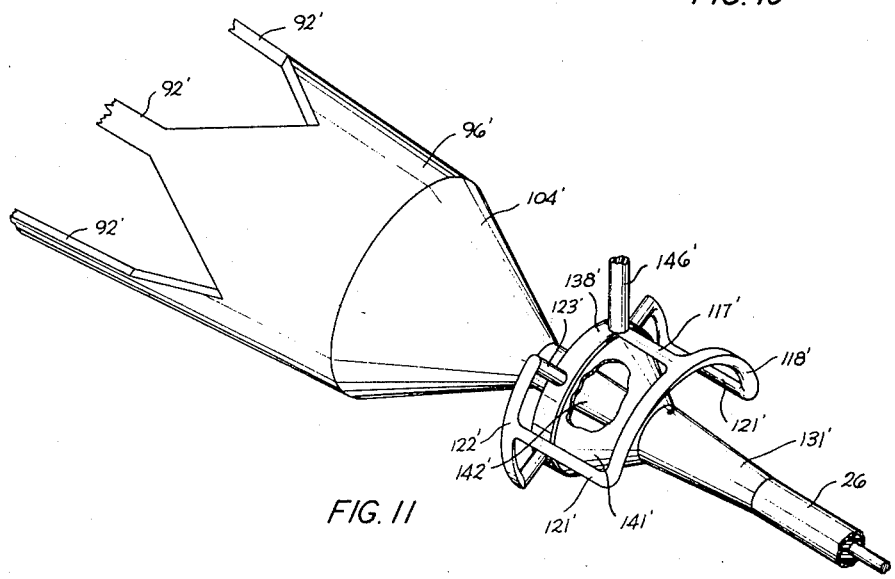
FIG. 11 is a perspective view of a column or stream of plastic insulating compound and the manner in which it is divided into a plurality of equal streams and recombined and applied to a filamentary core being covered with dissimilar plastic compound.

FIG. 11 illustrates the flow of plastic material 26 from the extrusion bore of the auxiliary extruder to the die 112 and onto the plastic material 23 being formed around the conductor 22 in the die 112. The various sections of the flow paths shown for both plastic materials have been provided with reference numerals according to the component of the extrusion tooling into and over which plastic material flows, with a prime (') following the reference numeral. It will be seen that each time a stream of plastic material is caused to undergo a division, the above balanced flow principles are applied.

The plastic compound 23 is preferably mixed with heat-decomposible expanding or blowing agent, for example, azodicarbonamide, which decomposes at a controlled temperature, evolving gases to form cells or bubbles in the plastic material 23 when the pressure in the extruder head is lowered sufficiently to permit the formation of said cells.

Alternatively, the plastic material 23 may be mixed with a nucleating agent, for example, particles of silica. Pressurized gas, for example, carbon dioxide, may be injected into the extrusion chamber to cause the nucleated plastic compound to achieve cellular form.

OPERATION

Referring again to FIGS. 2 and 3, the filamentary core 22 is advanced at a predetermined speed through the extrusion passageway or chamber 48 in the head 47, passing through a flared opening 157 formed in the retainer plug 57, the core tube retainer 106 and axially through the core tube 97 and the passageway through the die 112. The plastic material 23, for the inner insulating sheath around the core 22, in a molten or viscous fluid state, is forced horizontally from the delivery end of the main extrusion bore 37 into the opening 46 through the straining screen 42 and the plate 43 and into the feed port 72 communicating with the channel leg 71 formed in the periphery of the capsule 56.

The material 23 in the channel 71 flows parallel to the direction of the advancing core 22 for a short distance before it is divided into two oppositely directed circumferential streams in channel legs 73—73. Each stream thereafter undergoes a bend, flowing in the outer, diametrically opposed channel legs 76—76, parallel with and opposite to the direction in which the core 22 is advanced. The plastic material 23 flowing in the channels formed in the periphery of the capsule 56 is confined therein by the counterbore 52 of the extrusion passageway 48.

The material 23 in the outer legs 76—76 flows radially inward through the diametrically opposed bores 77—77, formed in the capsule 56, where they divide equally at the central portions of the arcuate channel legs 93—93 formed in the core tube holder 83. The four streams of material thus formed flow in channel legs 93—93 and 92—92 around the periphery of the cylindrical member 87, being confined therein by the cylindrical bore 68 formed in the capsule 56. The four streams thus formed bend toward the direction of advancement of the core 22, converging toward the confluence 96 formed on the core tube holder 83, flowing in the elongated channel legs 92—92 and being confined therein by the tapered opening 67 formed in the capsule 56.

The four equally spaced streams of plastic material 23 in the channel legs 92—92 converge at equally spaced points circumferentially around the confluence 96, flowing over the tip 104 of the core tube 97 into an opening defined by the tip 104 and the entrance portion 111 of the die 112 and into the throat portion 143 defined by the bores 142 and 131 to be formed around the advancing core 22.

The plastic material 26, for the outer sheath of insulating material of the insulated wire 21 is forced from an auxiliary extrusion apparatus (not shown) through the opening 152 of the fitting 148 vertically into the feed port 146 formed in the capsule 56 and into the aligned tip of the channel leg 117 formed in the periphery of part 113 of the die 112.

The plastic material 26 in channel 117 flows generally in the direction of the advancing core 22 dividing into two equal and oppositely directed circumferential streams in the channel legs 118—118, bending around in a direction generally opposite to the advancing core 22 through the channel legs 121—121. The material 26 flowing in each channel 121 is divided again into equal and oppositely directed circumferential streams in the channel legs 122—122, and passes through the bores 123—123 radially inward toward the advancing core 22. The flow of plastic material in the channeled periphery of the part 113 of the die 112 is confined therein by the bore 67 formed in the capsule 56.

The radially directed streams of plastic material 26 through the bores 123—123, enter the annular manifold 138 at four equally spaced circumferential points therearound. The fluent material 26 thus delivered to the manifold 138 is permitted therein to achieve a substantially steady state.

The plastic material 26 is forced out of the manifold 138 at a uniform rate through the frustoconical channel 141 to impinge circumferentially around the plastic material 23 being formed around the advancing core 22 in the throat 143 of the die 112.

Because the plastic material 23 is initially formed around the core 22 at the entrance portion 111 of the die before a substantial drop of pressure takes place the problem of plating out of the blowing agent therein is minimized. This also applies to the bore 142, since the fluid pressure of the material 23 has still not dropped substantially. Since the material 26 is delivered to the bore 131 externally of the material 23, the material 23 never contacts the bore 131 and no plating out of the blowing agent occurs. Thus both sheaths 23 and 26 are formed around the core simultaneously in the bore 131 after the material 23 has undergone an initial and an intermediate forming step at different pressure rates in the entrance portion 111 and the bore 142 of throat portion 143 in the die 112.

The entrance portion 111 of the die 112 and the bore 142 are of sufficient length, to permit the flow of plastic material 23 to develop around the core 22. The term "develop" refers to the achievement in the fluent plastic of a uniform distribution of pressure and velocity radially around the moving core 22. Thus, the plastic material 23 is given time in the die 112 to achieve steady state or uniform flow before the material 26 is extruded therearound. Additionally, the axial length of the channel 141 and bore 131 are selected to insure that the flow of material 26 has sufficient time to develop.

In extruding a polyvinyl chloride skin over an expanded polyethylene sheath, it has been determined that satisfactory results are achieved if the combined axial lengths of the entrance portion 111 and the bore 142 are at least 0.8 inches, the length of the channel 141 is at least 0.1 inches and the length of the bore 131 is at least 0.4 inches. Additionally, the widest part of the entrance portion 111 of the die 112 may be approximately 0.75 inches in diameter, tapering down to approximately one-eighth of an inch in diameter. The smaller end of the bore 131 at the exit end or tip of the die 112 may be from 30 to 70 mils in diameter.

The plastic material 23 being formed around the core 22 in the throat 143 of the die 112 contains gases in saturated solution being evolved from the decomposed azodicarbonamide blowing agent. These may include carbon dioxide, carbon monoxide, ammonia and nitrogen. As the formed sheaths approach the tip of the die 112, shear forces create heat energy, raising the temperature of the plastic material 23, decomposing substantially all of the blowing agent and supersaturating the plastic material 23. Some bubbles are also formed in the plastic.

As the core 22 exits from the smaller end of the die 112, the sudden reduction in pressure outside the head 47 permits the gases to expand to form blown cells in the material 23 thus expanding the plastic inner sheath therearound, while the outer sheath 26 of the finished dual insulated wire 21 is stretched equally, such that the wall thickness of each sheath is uniform around the core 22 and both sheaths 23 and 26 are concentric with respect to one another and with respect to the core 22.

It will be appreciated that though the preferred method of the invention has been described with respect to a pressure type extrusion apparatus, it is capable and is intended to be of application with respect to a tubular type extrusion apparatus. This can be accomplished simply by extending a thin hollow tube from the tip 104 of the core tube 97 to the exit tip of the die 112 to prevent the plastic material from contacting the core 22 at or beyond the exit tip of the die 112.

Additionally, the method of the invention may be utilized to form uniform laminated concentric filamentary or tubular plastic articles of indefinite length simply by running the apparatus without a core 22 or by extending a closed or solid tip from the core tube 97 through the throat 143 of the die 112. The tip may have the same diameter as the core 22 but would be stationary and extend to the exit tip of the die 112, thus making the passageway through the die annular in cross-section.

Furthermore, more than two plastic sheaths may be made by the method of the invention simply by introducing the plastic material for each successive outer sheath at a downstream section of the die passageway at a longitudinal distance sufficient to have allowed the flow of the preceeding material to develop.

Thus, the embodiments of the invention set forth are merely exemplary and other embodiments will be contemplated by those having ordinary skill in the art without departing from the spirit and scope of the invention.

What is claimed is:

1. A method of forming first and second concentric sheaths of plastic material around a longitudinally moving filamentary core, which comprises the steps of:
   passing the core through a confined passageway;
   introducing a first fluent plastic material into the passageway at an entrance section thereof circumferentially around and in the direction of the moving core and ultimately onto the core; and
   introducing a second fluent plastic material into the passageway at an intermediate section thereof after it has flowed a sufficient distance to have achieved a uniform distribution of velocity and pressure, circumferentially around and in the direction of the flowing first plastic material and the core and ultimately onto the first plastic material, at a sufficient distance from the point of introduction therein of the first plastic material to have allowed the flow of the first plastic material to have achieved a uniform distribution of velocity and pressure, to form first and second concentric sheaths of plastic material around said core between the intermediate section of the passageway and the exit section thereof.

2. A method of forming first and second concentric sheaths of plastic material around a longitudinally moving filamentary core, which comprises the steps of:
   passing the core through a confined passageway;
   introducing a first fluent plastic material into the passageway at an entrance section thereof circumferentially around and in the direction of the moving core;
   preventing the first material from contacting the core until it has passed out of the passageway; and
   introducing a second fluent plastic material into the passageway at an intermediate section thereof at a uniform distribution of velocity and pressure, circumferentially around and in the direction of the flowing first plastic material and ultimately onto the first plastic material, at a sufficient distance from the point of introduction therein of the first plastic material to have allowed the flow of the first plastic material to have achieved a uniform distribution of velocity and pressure, simultaneously to form first and second concentric sheaths of plastic material around the core passing out of the passageway.

3. A method of forming an outer sheath of plastic material concentrically around an inner sheath of plastic material being extruded onto a longitudinally moving elongated core, which comprises the steps of:
   directing a plurality of streams of plastic material radially toward the advancing core while the inner sheath is being formed therearound;
   combining said streams into a single stream flowing in an annular path around and spaced from the advancing core; and
   forcing a frustoconical stream of plastic after it has flowed a sufficient distance to have achieved a uniform distribution of pressure and velocity, circumferentially from the annular stream toward and in the direction of advancement of the core to impinge circumferentially around the inner sheath.

* * * * *